United States Patent [19]

Mahoney et al.

[11] Patent Number: 6,020,972
[45] Date of Patent: Feb. 1, 2000

[54] SYSTEM FOR PERFORMING COLLECTIVE SYMBOL-BASED COMPRESSION OF A CORPUS OF DOCUMENT IMAGES

[75] Inventors: James V. Mahoney, Los Angeles; William J. Rucklidge, Mountain View, both of Calif.

[73] Assignee: Xerox Corporation, Stamford, Conn.

[21] Appl. No.: 08/970,970

[22] Filed: Nov. 14, 1997

[51] Int. Cl.[7] .......................... G06T 15/00; G05B 11/00
[52] U.S. Cl. .......................... 358/1.14; 358/1.2; 358/1.1
[58] Field of Search ..................... 395/114, 111, 395/101, 102, 112, 113, 115, 116; 358/1.14, 1.02, 1.1, 1.17, 1.15, 1.16, 467; 382/290, 292; 707/101, 514, 515, 516, 907

[56] References Cited

U.S. PATENT DOCUMENTS

| | | | |
|---|---|---|---|
| 5,303,313 | 4/1994 | Mark et al. | 382/56 |
| 5,305,433 | 4/1994 | Ohno | 395/150 |
| 5,321,770 | 6/1994 | Huttenlocher et al. | 382/22 |
| 5,331,556 | 7/1994 | Black, Jr. et al. | 364/419.08 |
| 5,504,843 | 4/1996 | Catapano et al. | 395/115 |
| 5,539,841 | 7/1996 | Huttenlocher et al. | 382/218 |
| 5,778,361 | 7/1998 | Nanjo et al. | 707/5 |
| 5,884,014 | 3/1999 | Huttenlocher et al. | 395/114 |
| 5,911,140 | 6/1999 | Tukey et al. | 707/5 |
| 5,940,822 | 8/1999 | Haderle et al. | 707/3 |

OTHER PUBLICATIONS

U.S. Patent Application No. 08/575,305, entitled "Classification of Scanned Symbols into Equivalence Classes," to Daniel Davies, filed Dec. 20, 1995.

U.S. Patent Application No. 08/575,313, entitled "Consolidation Of Equivalence Classes Of Scanned Symbols," to Daniel Davies, filed Dec. 20, 1995.

U.S. Patent Application No. 08/652,864 entitled "Fontless Structured Document Image Representations for Efficient Rendering," to Daniel R. Huttenlocher et al., filed May 23, 1996.

U.S. Patent Application No. 08/655,546 entitled "Method and Apparatus for Comparing Symbols Extracted from Binary Images of Text" William J. Rucklidge et al., filed May 30, 1996.

U.S. Patent Application No. 08/752,497, entitled "Using Fontless Structured Document Image Representations To Render Displayed And Printed Documents At Preferred Resolutions," to Daniel R. Huttenlocher et al., filed Nov. 8, 1996.

*Primary Examiner*—Jerome Grant, II
*Assistant Examiner*—Douglas Tran

[57] ABSTRACT

A method and apparatus for compressing a corpus of document images into a collective tokenized representation. Initially, documents in the corpus are individually compressed into a document tokenized format. A document image in the document tokenized format is represented using a symbol table and a table of positions. Each symbol in the symbol table is a shape in the original document image. The positions in the table of positions indicates where the symbols in the symbol table are placed to form the document image. Subsequently, the individual symbol tables of each document in the corpus are assembled to form clusters of similar shapes. These clusters are then analyzed to identify the degree of interrelationship between the symbols in the individual symbol tables. Individual document symbol tables with a large number of recurring symbols are grouped together. For each of the groups of symbol tables, a collective symbol table is computed. The collective symbol table improves the compression ratio of a corpus by eliminating redundant shapes appearing in the individual document symbol tables. Also, the collective symbol table advantageously identifies groupings of documents in the corpus which are related because a significant number of similar shapes are used in each of the documents.

17 Claims, 9 Drawing Sheets

SYSTEM FOR PERFORMING COLLECTIVE SYMBOL-BASED COMPRESSION OF A CORPUS OF DOCUMENT IMAGES

CROSS-REFERENCE TO RELATED APPLICATIONS

Cross-reference is made to U.S. patent applications Ser. No. 08/652,864, entitled "Fontless Structured Document Image Representations For Efficient Rendering" (now U.S. Pat. No. 5,884,014), and Ser. No. 08/752,497, entitled "Using Fontless Structured Document Image Representations To Render Displayed And Printed Documents At Preferred Resolutions", which are assigned to the same assignee as the present invention.

BACKGROUND OF THE INVENTION

1. Field of the Invention

The present invention relates generally to image compression, and more particularly, to a method and apparatus for compressing a corpus of document images using structured tokenized representations that are resolution-dependent.

2. Description of Related Art

Structured document representations provide digital representations for documents that are organized at a higher, more abstract level than merely an array of pixels. Known structured document representation techniques pose a tradeoff between the speed with which a document can be rendered (i.e., converted to a displayable or printable output) and the expressiveness with which it can be represented. One high-level resolution-independent structured document representation is a page description language (PDL), such as PostScript®. PDLs tend to be high-level structure document representations because they contain expressions which include a great deal of information about document structure. In contrast, purely textual representations of a document that is encoded in ASCII (American Standard code for Information Interchange) has no formatting information. Because of its simplicity, an ASCII encoded document generally requires less time to render than a PDL document with formatting information.

In contrast to resolution-independent document representations, documents represented in a DigiPaper file format are resolution-dependent. The DigiPaper file format is a token-based structured document representation that is both highly expressive and fast to render. The DigiPaper structure document format is described in detail in U.S. patent application Ser. Nos. 08/652,864 and 08/752,497. In the DigiPaper format, pages of a document are represented using a "dictionary" of tokens or symbols that appear in the document. In addition to the dictionary of tokens, each page includes position information specifying where tokens on the page appear. Each token in the dictionary of tokens is a portion of a document image such as a bitmap of a character.

In addition to being resolution-dependent, the DigiPaper file format achieves some degree of lossless data compression. Unlike prior symbol-based token matching which have been used only for lossy image compression, a DigiPaper representation of a document image can be used to achieve lossless compression of original document images produced from structured document representations. The DigiPaper file format achieves high compression ratios because each symbol is stored just once per document in the dictionary of tokens, rather than once for each occurrence in a document. Further compression is achieved by encoding the sequence of positions of tokens in the dictionary using for example Huffman coding.

In general, the DigiPaper file format described in U.S. patent application Ser. Nos. 08/652,864 and 08/752,497 can be used in any environment where quick, high-quality document rendering is required. For example in production printing, the compression achieved using the DigiPaper file format enables documents to be rendered in one location and printed in another location. In addition to being compact, the DigiPaper file format is easy to decode thereby enabling other applications such as prepress viewing, desktop publishing, document management systems, and distributed printing applications, as well as fax communications. This aspect of the DigiPaper file format guarantees document fidelity during prepress viewing, without requiring the development of special prepress viewers.

A large number of documents are represented on the World Wide Web using HTML (HyperText Markup Language). Generally, HTML allows markup of the structure of a document, but not markup of the layout of a document. For example, a block of text can be specified as a "first-level" heading with no font or justification. Consequently, the manner in which an HTML document is rendered depends on a user's particular browser or computer. In contrast, documents represented in the DigiPaper file format can be rendered with fidelity comparable to print media, because of its tokenized file format. In particular, with the emergence of standard programmable viewers (i.e., Java enabled internet browsers), the DigiPaper file format can be used to define self-rendering documents. That is, a Java applet can be used to perform the rendering of a document in a DigiPaper file format independent of the particular internet browser or computer. In addition, documents encoded in the DigiPaper file format can be rendered at speeds of under one second per page for text and graphics. This means fewer unwanted delays for users downloading documents from remote servers on the internet.

Because of the ease with which documents can be accessed using an internet browser such as Netscape's Navigator or Microsoft's Explorer, more and more documents are being stored on the internet and on intranets. These documents may in some instances form a part of a large corpus of heterogenous documents. Users browsing a large corpus of documents on the internet and on intranets have the propensity for browsing or retrieving more than one document from the corpus during a single session. For example, a user searching a corpus of documents tends to examine several documents before identifying one or more of interest to be printed or retrieved. In the event the documents in the corpus are encoded in the DigiPaper file format, it would be desirable to have a compression technique that more efficiently compresses a corpus of documents where each document in the corpus is individually encoded in the DigiPaper file format. More generally, it would be desirable to have a compression technique which maximizes compression for a collection of heterogenous document images.

SUMMARY OF THE INVENTION

In accordance with the invention there is provided a system, and method and article of manufacture therefor, for compressing a corpus of document images stored in a memory of a computer system. In compressing the corpus of document images, each document image stored in the memory is converted into a tokenized representation that includes a document symbol table and a document position table. Symbol tables of the tokenized representations of document images are then arranged into groups of symbol tables with recurring symbols. For each grouping of symbol tables, a collective symbol table is computed. The computed collective symbol tables compress the tokenized representations of document images stored in the memory by sharing recurring symbols across the document images in the corpus.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. System Overview

Figure 1:
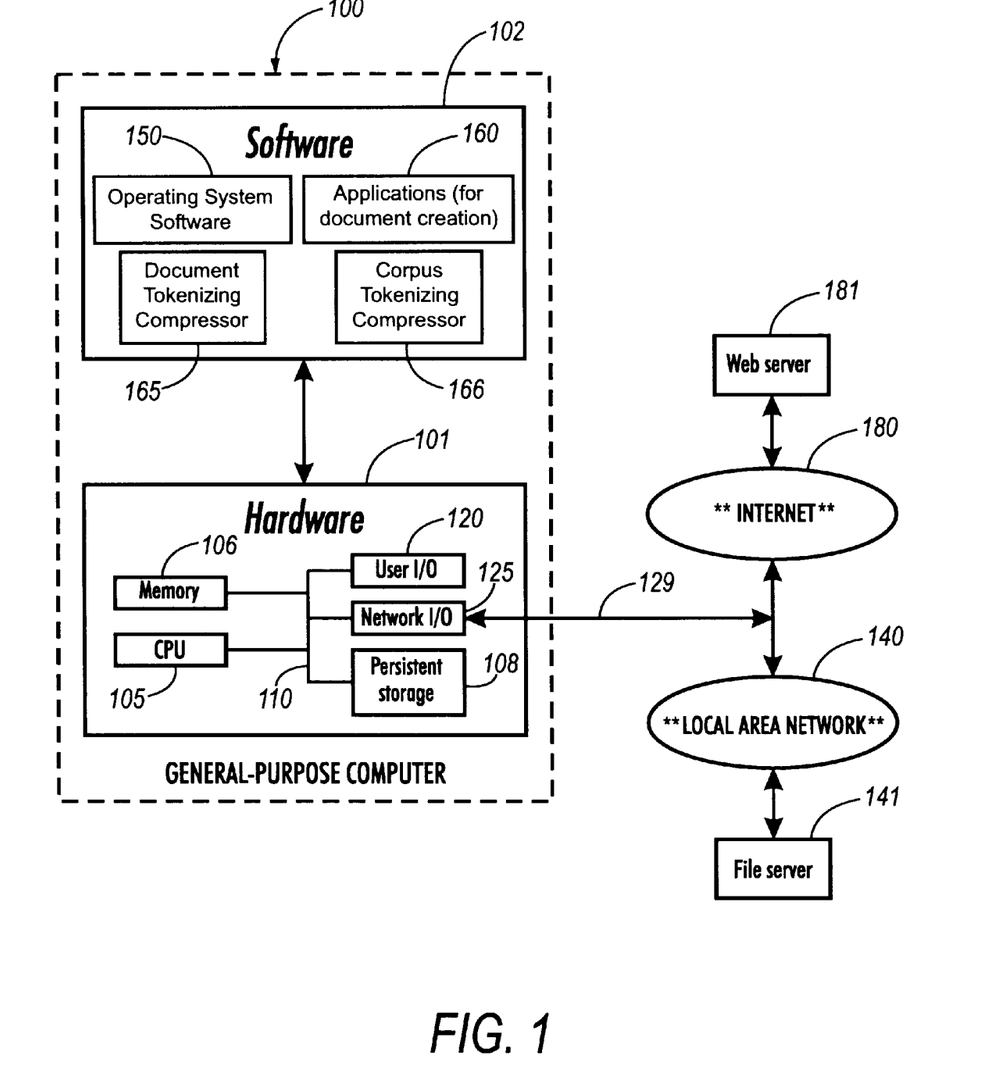
FIG. 1 illustrates hardware and software components of an exemplary system suitable for practicing the present invention.

Referring now to the drawings where the showings are for the purpose of describing the invention and not for limiting same, FIG. 1 illustrates hardware and software components of an exemplary system suitable for practicing the present invention. The system of FIG. 1 includes a general-purpose computer 100 connected by one or more communication pathways, such as connection 129, to a local-area network (LAN) 140 and also to a wide-area network, here illustrated as the Internet 180. Through LAN 140, computer 100 can communicate with other local computers, such as a file server 141. Through the Internet 180, computer 100 can communicate with other computers, both local and remote, such as World Wide Web server 181. As will be appreciated, the connection from computer 100 to Internet 180 can be made in various ways, e.g., directly via connection 129, or through local-area network 140, or by modem (not shown).

Computer 100 is a personal or office computer that can be, for example, a workstation, personal computer, or other single-user or multi-user computer system. For purposes of exposition, computer 100 can be conveniently divided into hardware components 101 and software components 102. It will be appreciated by those skilled in the art that the line between a host computer and its attached peripherals is not exact, and that components that are considered peripherals of some computers are considered integral parts of other computers. Thus, for example, user I/O 120 can include a keyboard, a mouse, and a display monitor, each of which can be considered either a peripheral device or part of the computer itself, and can further include a local printer, which is typically considered to be a peripheral. As another example, persistent storage 108 can include a CD-ROM (compact disc read-only memory) unit, which can be either peripheral or built into the computer.

The hardware components 101 of computer 100 include a processor (CPU) 105, memory 106, persistent storage 108, user I/O 120, and network interface 125. Processor 105 can be, for example, a microprocessor or a collection of microprocessors configured for multiprocessing. In some embodiments computer 100 may be part of a distributed environment; in such embodiments, the functionality of computer 100 in the system of FIG. 1 is taken on by a combination of computers, and the processing capabilities of processor 105 are provided by the combined processors of the multiple computers. Memory 106 can include read-only memory (ROM), random-access memory (RAM), virtual memory, or other memory technologies, singly or in combination. Persistent storage 108 can include, for example, a magnetic hard disk, a floppy disk, or other persistent read-write data storage technologies, singly or in combination. It can further include mass or archival storage, such as can be provided by CD-ROM or other large-capacity storage technology. (Note that file server 141 provides additional storage capability that processor 105 can use.) User I/O (input/output) hardware 120 typically includes a visual display monitor such as a CRT or flat-panel display, an alphanumeric keyboard, and a mouse or other pointing device, and optionally can further include a printer, an optical scanner, or other devices for user input and output. Network I/O hardware 125 provides an interface between computer 100 and networks 140 and 180. More specifically, network I/O 125 lets processor 105 communicate via connection 129 with other processors and devices through LAN 140 and through the Internet 180.

Software components 102 include an operating system 150 and a set of tasks under control of operating system 150, such as an application program 160, document tokenizing compressor 165, and corpus tokenizing compressor 166. In one embodiment the tokenizing compressors 165 and 166 may be associated with an article of manufacture that is packaged as a software product in a portable storage medium (not shown) which can be read by the computer system 100 through a user I/O device 120 such as a CD ROM reader. The storage medium may, for example, be a magnetic medium such as floppy disk or an optical medium such as a CD ROM, or any other appropriate medium for storing data.

In operation, operating system 150 allows processor 105 to control various devices such as persistent storage 108, user I/O 120, and network interface 125. Processor 105 executes the software of operating system 150 and its tasks 160, 165, and 166 in conjunction with memory 106 and other components of computer system 100. The function performed by document tokenizing compressors 165 and corpus tokenizing compressor 166 can be divided up among operating system 150 and its tasks as may be appropriate to the particular circumstances. In general, the document tokenizing compressor 165 carries out a tokenizing compilation of input PDL or input raster documents, whereas the corpus tokenizing compressor 166 carries out tokenizing compilation of a corpus of tokenized documents. The input documents can be provided from any number of sources. In particular, the input PDL documents can be generated as output by application program 160, retrieved from persistent storage 108 or file server 141, or downloaded from the Internet 180, e.g., from Web server 181.

B. DigiPaper Tokenized Representation of A Document

More specifically, the document tokenizing compressor 165 shown in FIG. 1 generates highly compressed documents from both scanned documents (i.e., raster images) and RIPped documents (i.e., PDL documents rendered to page images). The format in which the highly compressed documents are represented by the compressor 165 is defined herein as "DigiPaper." Briefly, in the DigiPaper format, images of a document are represented using a dictionary of tokens (or a table of symbols) that appear in the document. In addition to the dictionary of tokens, each image includes a table of positions which records position information specifying where each token appears. Each token in the dictionary of tokens is a portion of a document image such as a bitmap of a character. The DigiPaper file format for a single document image is described in detail in U.S. patent application Ser. Nos. 08/652,864 and 08/752,497, which are incorporated herein by reference.

Figure 2:
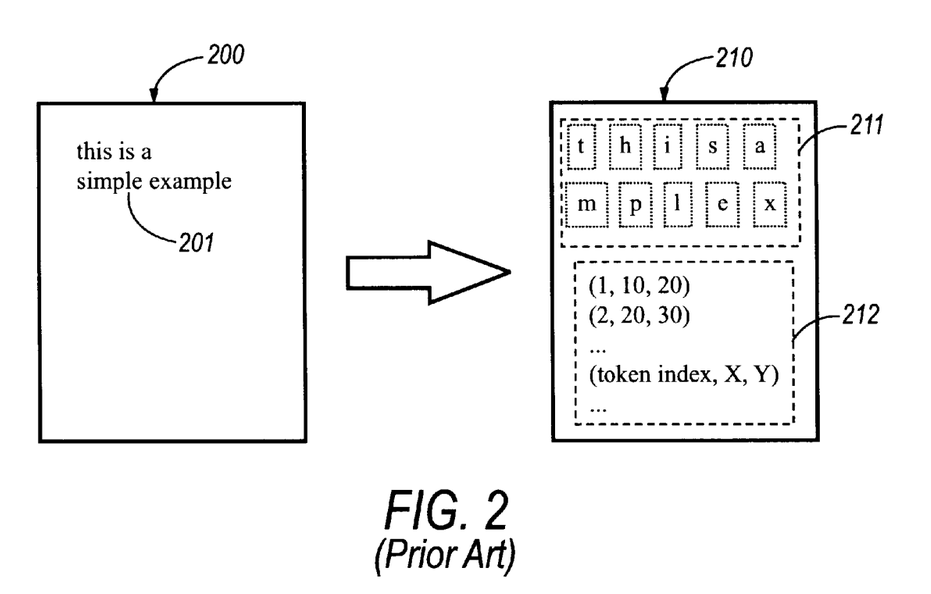
FIG. 2 illustrates the concepts of tokens and positions through a highly simplified example with a one-page input document image.

FIG. 2 illustrates the concepts of tokens and positions through a highly simplified example with one-page input document image 200 which includes text 201. Using the document tokenizing compressor 165, a tokenized representation 210 is generated from the input image 200. The tokenized representation 210 includes a dictionary of tokens 211 (also referred to herein as a symbol table) and a table of positions 212. Each of the tokens in dictionary 211 represents a shape that occurs somewhere in the input image 200. Each shape is stored as a bitmap in the dictionary 211. Each of the positions in table 212 represents where one of the tokens is to be placed. That is, positions in table 212 indicate where a token's shape occurs in the input image. For example, the shape "t," which is associated with the first token, appears at a position whose (X, Y) coordinates are given by the ordered pair (10, 20). The shape "h," which is associated with the second token, appears at a position whose (X, Y) coordinates are given by the ordered pair (20, 30). In general, each of the positions 212 includes a token index, that is, an index indicating a particular one of the tokens in dictionary 211, together with an (X,Y) coordinate pair that tells where the indicated token's shape occurs in the document.

To generate the tokenized representation 210 from the document image 200, a computer detects the different shapes that appear in the document image and notes where they appear. For example, scanning from left to right beginning with the first line of text 201, the computer first finds the shape "t", then the shape "h", then the shape "i", then the shape "s." The computer records each of these shapes as tokens in dictionary 211, and records their respective positions as positions 212. Continuing rightward, the computer next finds another "i"; since this shape is already in the dictionary, the computer need only record its position. The computer continues this procedure until the entire document image has been scanned. In short, the computer tokenizes the image by finding each shape in turn, determining whether that shape is already in the token dictionary, adding it to the dictionary if not and, in any case, storing its position in the table of positions.

Note that the dictionary of tokens 211 is not a font. The DigiPaper tokenized representation of a document includes no notions of semantic labeling or of character sets, no encoding or mapping of sets of character codes to sets of character names. The shapes "t", "h", "i" and so forth are treated as just shapes, that is, particular bitmaps, and not as letters of an alphabet or members of a larger set of character codes. The shapes appear in the dictionary in an arbitrary order for example based on their sizes rather some fixed order such as an ordering based on their symbolic meaning. The shapes that appear in the document dictate what will be in the dictionary, and not the reverse. Also note that shapes which occur repeatedly in the document can be used as token shapes, including shapes that have no symbolic meaning at all. The shapes that make up text 201 in document image 200 happen to be recognizable to English-speaking humans as alphabetic characters, but they could just as well be cuneiform characters or meaningless squiggles, and the compressor 165 would process them in the same way. Conversely, a given letter of the alphabet that is to be rendered as two distinct shapes (e.g., at two different sizes or in two different typefaces) will be assigned two different tokens, one for each distinct shape in which that letter appears.

To reconstruct the image 200 from the tokenized representation 210, a computer, executing commands from a document tokenizing decompressor (shown in FIG. 12 and discussed in more detail below in Section D), reads sequentially through the positions 212 and, for each position, transfer the shape of the token whose index is listed to the listed (X,Y) coordinate. Thus, in reconstructing the image 200, a computer reuses the first token (the shape "T") once, the second token (shape "h") once, the third token (shape "i") three times, the fourth token (shape "s") three times, etc. Generally, the more often a token's shape appears in a document, the greater the compression ratio obtainable through the tokenized representation.

Figure 3:
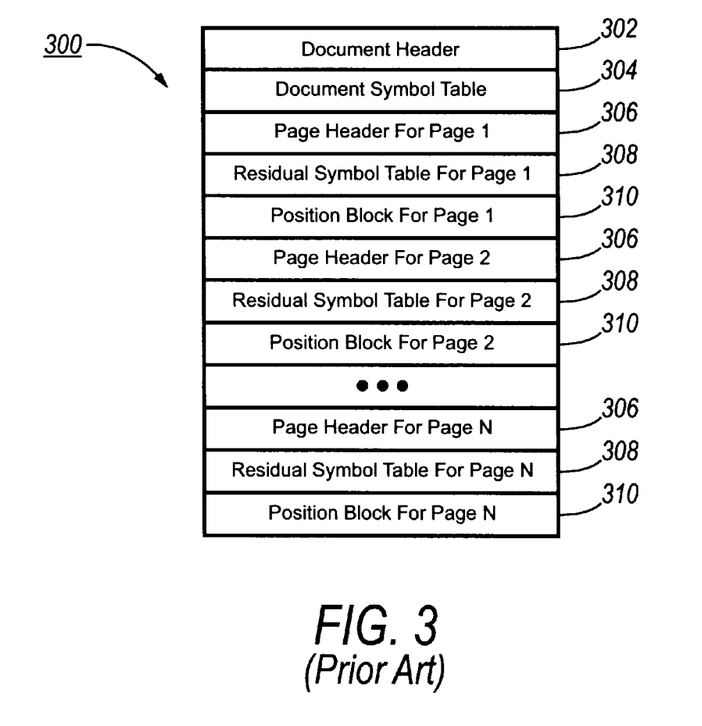
FIG. 3 illustrates a tokenized representation of a multi-page document image.

For a one-page document image such as image 200, it is not necessary to encode page information in the tokenized representation. For multi-page images of longer documents, a tokenized representation 300 is defined that includes information about which token shapes appear on which pages in a document, as illustrated in FIG. 3. The tokenized representation 300 includes a document header 302 and a document symbol table 304. Specific to each page in a document, the tokenized representation 300 includes a page header 306, a residual symbol table 308, and a position block 310. Each residual symbol table 308 includes those symbols that are unique to a particular page of a document. Typically with tokenized representations, higher compression ratios are obtained for multi-page documents, because the longer the document, the more often each token can be reused. Each position block 310 specifies the positions of symbols for a page, which symbols can be found in either the document symbol table 304 or the residual symbol table 308.

Figure 4:
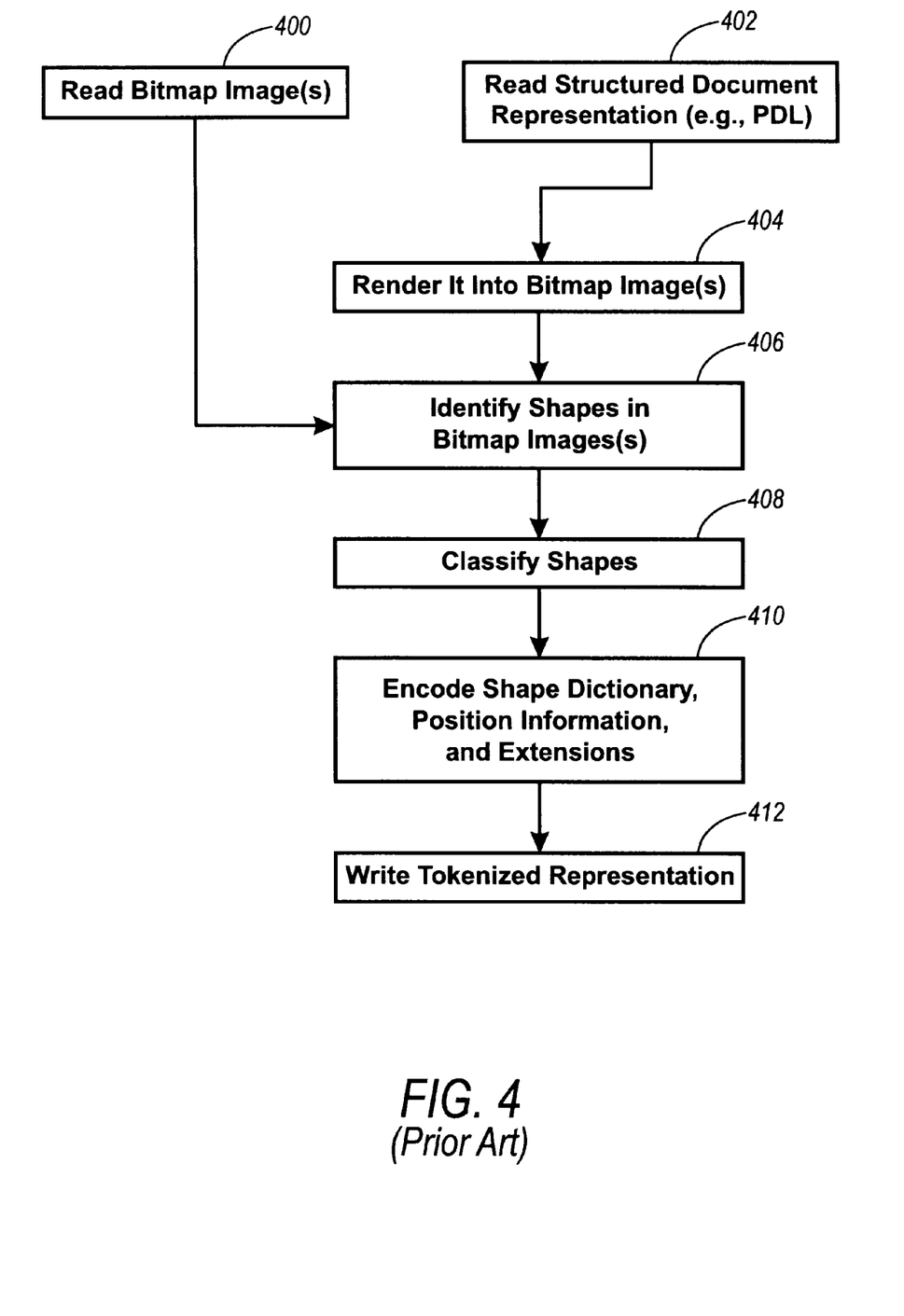
FIG. 4 shows a sequence of steps for compiling a structured representation or a bitmap representation of a document into a tokenized representation of a document.

FIG. 4 shows a sequence of steps for compiling a structured representation or a bitmap representation of a document into a tokenized representation of a document. A structured document representation, such as a PDL file, is read into working memory at step 402 and is rendered into a set of bitmap images, one per page, at step 404, by a conventional PDL decomposer. Thereafter, tokenizing compression is performed at steps 406, 408, and 410, by the compressor of either a bitmap image rendered at step 404 or an original bitmap image read into memory at step 400. At step 406, the bitmap images are analyzed to identify the shapes therein. Next, these shapes are classified, so that multiple occurrences of the same shape can be assigned to the same token, at step 408. Thereafter, the token dictionary, position information, and residual document elements are encoded, at step 410, together with any extensions, such as hypertext links or embedded non-binary image components. This completes the construction of the tokenized compressed representation, which is then output and recorded in memory, at step 412.

More specifically, the step 406 of identifying shapes can be performed using a connected components analysis, although any other suitable technique can be used (e.g., segmentation). Also in the case that a PDL document is rendered into a bitmap image at step 404, the step 408 of classifying shapes is performed using a very simple, lossless classifier which considers two shapes to match one another if and only if they are bitwise identical. Bitwise matching works well in the case of a document image that is tokenized from an image that is generated directly from a PDL or other structured document description because such bitmap images are inherently free from noise, losses, distortions, scanning artifacts, and the like. In instance scanned images are compiled into a tokenized representation at step 400 and 406, the step 408 of classifying shapes is performed using approximate or heuristic classifiers as is done in known methods of tokenizing scanned documents.

C. DigiPaper Tokenized Representation of A Corpus of Documents

Once a set of documents (whether PDL representations or scanned images) are individually compressed into a DigiPaper file format by compressor 165, the set of documents is further compressed by corpus tokenizing compressor 166. In accordance with the invention, corpus tokenizing compressor 166 improves compression of individually tokenized documents by developing token dictionaries which span typeface-homogenous portions of a document corpus. Briefly, a corpus of documents in the document tokenized (or DigiPaper file) format are further compressed by corpus compressor 166 after performing two sets of operations. During the initial set of operations, the compressor 166 divides the corpus into relatively typeface-homogenous subsets of tokens or symbols. During a subsequent set of operations, a group dictionary is defined for each of the typeface-homogenous subsets of tokens. To the degree that a corpus contains typeface homogeneity, compressor 166 improves the overall compression ratio of a corpus of documents where each document is individually compressed in the DigiPaper file format. Advantageously, the costs incurred in storing or transmitting multiple documents in the corpus of documents is reduced by sharing a group dictionary across multiple documents.

Figure 5:
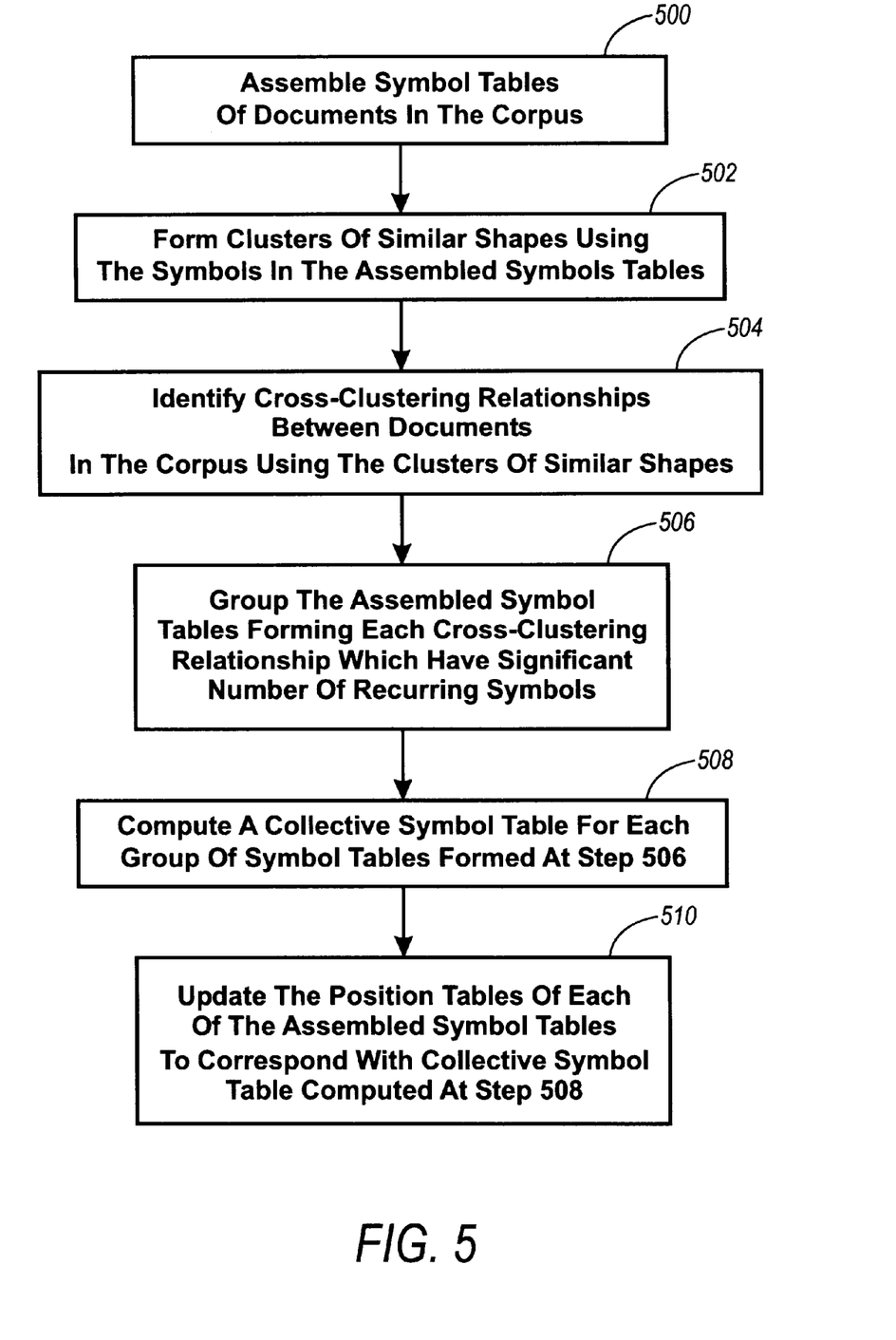
FIG. 5 is a flow diagram which sets forth the steps for compressing a corpus of documents in the tokenized file format.

FIG. 5 is a flow diagram which sets forth the steps for compressing a corpus of documents in the DigiPaper file format. In general, a file in a DigiPaper file format includes a document token dictionary (or symbol table) 211 and a table of positions 212 (see FIG. 2). It will be appreciated by those skilled in the art that the DigiPaper file format is just one example of a tokenized file format which can be used to perform the present invention. In describing the steps set forth in FIG. 5, reference is intermittently made to an example corpus of three documents in FIGS. 6–10 to illustrate operations performed at each step shown in FIG. 5. It will be understood by those skilled in the art that the example shown in FIGS. 6–10 is highly simplified, and that in reality a document corpus may contain significantly more than three document images, each of which may include one or more page images.

Figure 6:
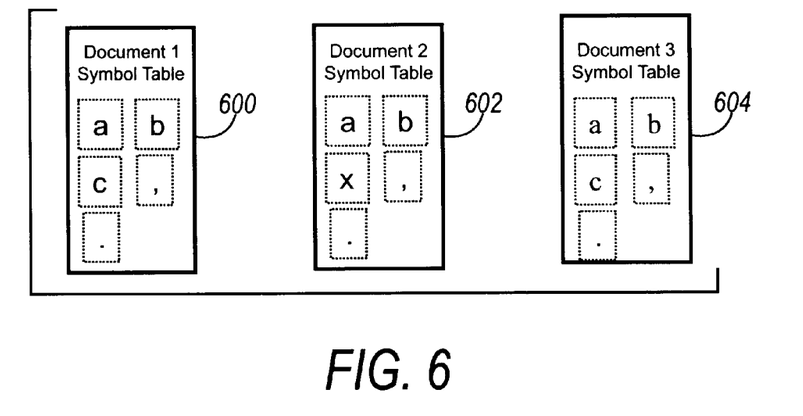
FIG. 6 illustrates an example where three symbol tables (or token dictionaries) are assembled from a corpus of documents.

At step 500, the symbol tables (or token dictionary) 211 of each document in a corpus of documents stored for example on file server 141 or web server 181 is assembled (or collected) by corpus tokenizing compressor 166 (shown in FIG. 1). For example, FIG. 6 illustrates three symbol tables 600, 602, and 604 that are assembled from a corpus of documents with three document images (not shown). As set forth above, the three symbol tables 600, 602, and 604 are generated by document tokenizing compressor 165.

At step 502, the corpus tokenizing compressor forms clusters of symbols with similar shapes from the symbols in the tables assembled at step 500. Generally, shapes are defined herein to be similar if their salient features match each other within some predefined tolerance level. For example, one predefined tolerance level is an acceptable ratio of pixels in one shape lying inside some dilated representation of the other shape, and vice versa. As set forth above, a symbol need not be a character from a font but instead can be any type of image element. In one embodiment, symbols from a set of assembled symbol tables are clustered into one or more equivalence classes. Each of the equivalence classes is formed using a Hausdorff-like method by determining whether at least two symbols fit within some tolerance into dilated representations of each other. An example of a method and apparatus which uses a Hausdorff-like method to form equivalence classes is disclosed in U.S. patent application Ser. No. 08/655,546, entitled "Method and Apparatus For Comparing Symbols Extracted From Binary Images of Text," which is incorporated herein by reference.

Figure 7:
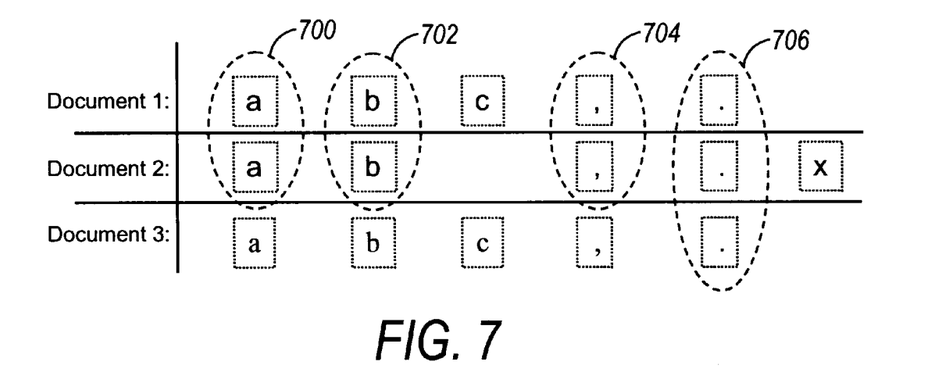
FIG. 7 illustrates a table which organizes the symbols of each document symbol table shown in FIG. 6 into rows.

For example, FIG. 7 illustrates a table which organizes the symbols of each document symbol table into rows. Each column of the table in FIG. 7 includes those symbols in the assembled symbol tables 600, 602, and 604 having some degree of equivalence. However, only those symbols in each of the clusters 700, 702, 704 and 706 are sufficiently equivalent to be labeled as similar. For example, the "a" symbols from documents one and two are sufficiently similar to define the cluster of symbols 700. Whereas the "a" symbol from document 3 has enough differences compared to the other "a" symbols to be excluded from the equivalence class defined by the cluster of symbols 700.

At step 504, one or more cross-clustering relationships are identified between the assembled symbol tables. More specifically, in identifying cross-clustering relationships, each cluster of symbols formed at step 502 is represented using a composite symbol. In one embodiment, the composite symbol is specified by randomly selecting one of the symbols in the cluster of symbols. In an alternate embodiment, the composite symbol is specified by computing an average symbol that most closely represents a majority of the symbols in a cluster. It should be noted that a corpus can have one or more cross-clustering relationships. In effect, a cross-clustering relationship is created from each of those document symbol tables with at least one symbol that has been clustered with symbols from other documents.

Figure 8:
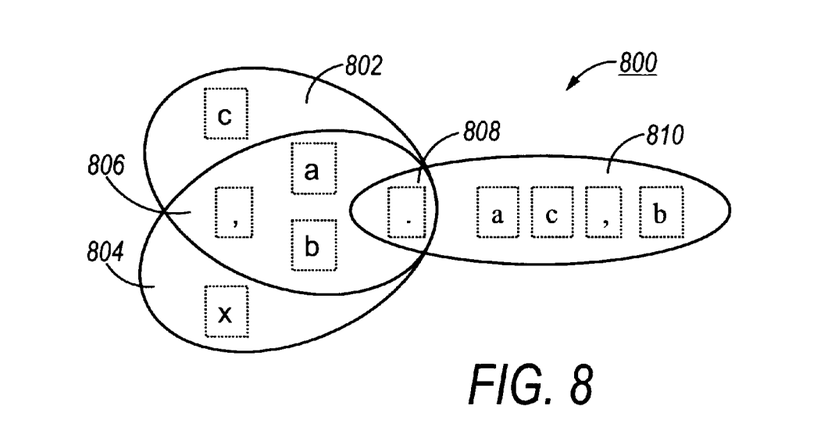
FIG. 8 illustrates a cross-clustering relationship for the clusters shown in FIG. 7 using a Venn diagram.

FIG. 8 illustrates a cross-clustering relationship 800 for the clusters shown in FIG. 7 using a Venn diagram. In overlapping regions of the Venn diagram 800 are a single symbol which is selected from the cluster of symbols shown in FIG. 7. For example, overlapping region 808 includes a symbol from only cluster 706, whereas overlapping region 806 includes a symbol from each of the clusters 700, 702, and 704. The non-overlapping regions 802, 804, and 810 correspond to symbols in a document symbol table which did not form part of any of the clusters formed in FIG. 7.

At step 506, document symbol tables forming parts of the cross-clustering relationships identified at step 504 are grouped together by the compressor 166 when there exits a significant number of recurring symbols between documents. The exact number of recurring symbols required before grouping symbol tables of documents together involves a tradeoff between the number of groupings created for a corpus and the compression ratio of any one group. In one embodiment, documents are grouped together if at least a majority of symbols recur between two symbol tables. In alternate embodiments, documents are grouped together when less than a majority of symbols recur between two symbol tables. Single groupings of symbol tables are formed when an insufficient number of symbols or no symbols overlap with other document dictionaries in the corpus.

Figure 9:
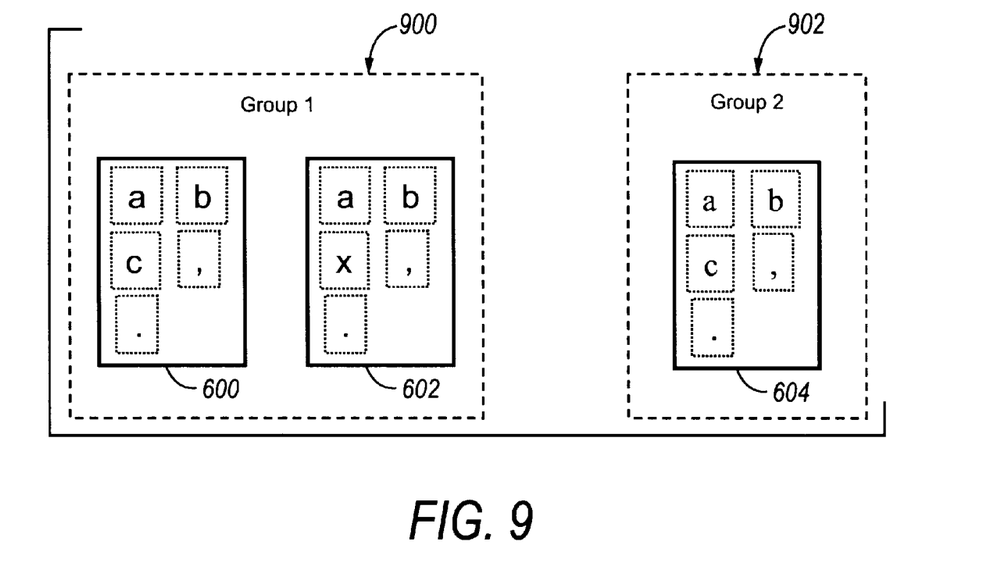
FIG. 9 illustrates two groupings which are defined using the cross-clustering relationship shown in FIG. 8.

FIG. 9 illustrates two groupings 900 and 902 which are defined using the cross-clustering relationship 800 shown in FIG. 8. As illustrated in the Venn diagram in FIG. 8, the overlapping regions 806 and 808 between the symbols found in tables 600 and 602 are sufficient to define the grouping 900. In contrast, the overlapping region 808 contains an insufficient number of symbols to form a grouping; this results in a grouping 902 to be formed with only one symbol table 604.

For each of the groupings formed at step 506, a collective symbol table is computed at step 508. In computing a collective symbol table for a grouping of document dictionaries, a group symbol table and residual document symbol tables are defined. In the event there is only one document symbol table in a grouping, the document symbol table is simply assigned to be the collective symbol table for that document. In the event there is only one document symbol table in a grouping, the compression ratio of the corpus is not improved. Finally at step 510, the table of positions 212 associated with each document symbol table 211 are updated to reflect the collective symbol table computed at step 508. However, in the event document symbol table groupings have only one symbol table, as shown for example by the grouping 902 in FIG. 9, the table of positions associated with such a document symbol table need not be updated.

Figure 10:
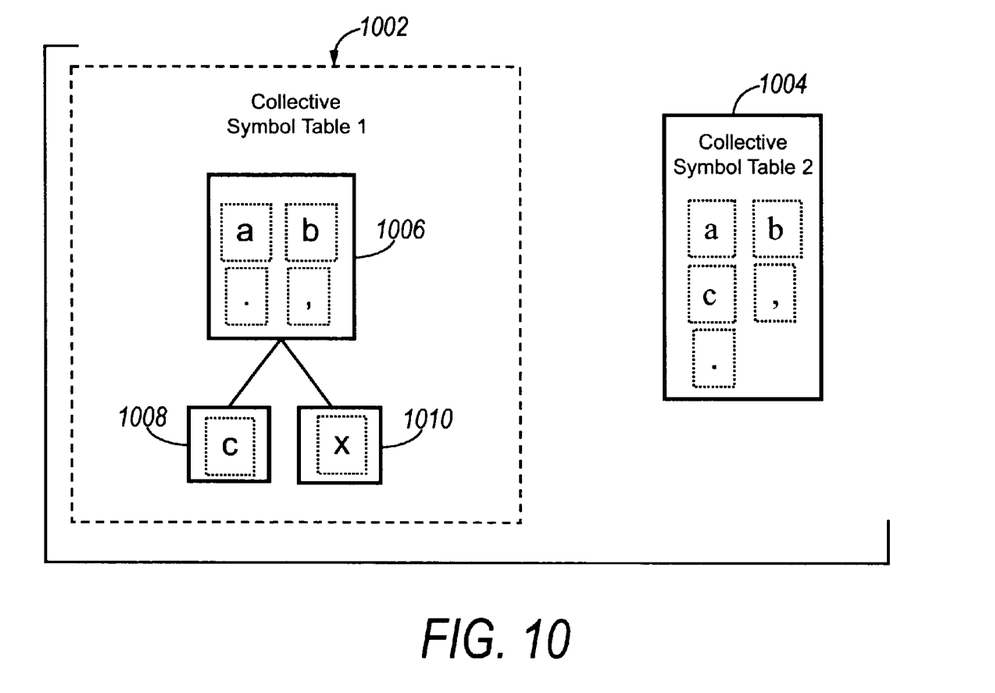
FIG. 10 illustrates the formation of collective symbol tables from the groupings shown in FIG. 9.

FIG. 10 illustrates the formation of collective symbol tables 1002 and 1004 from the groupings 900 and 902 shown in FIG. 9, respectively. The collective symbol table 1002, which is formed from the grouping of document dictionaries 600 and 602, includes a group symbol table 1006 and two residual document symbol tables 1008 and 1010. In the embodiment shown in FIG. 10, the group symbol table 1006 is a root node and residual document symbol tables 1008 and 1010 are leaf nodes of a hierarchical structure. The symbols in each of the nodes can be determined from the Venn diagram shown in FIG. 8. Specifically, those symbols in the overlapping regions 806 and 808 are included as part of the group symbol table 1006, while symbols in non-overlapping regions 802 and 804 are assigned to residual document symbol tables 1008 and 1010, respectively. In addition, those symbols in document symbol table 604 are used form the collective symbol table 1004.

Figure 11:
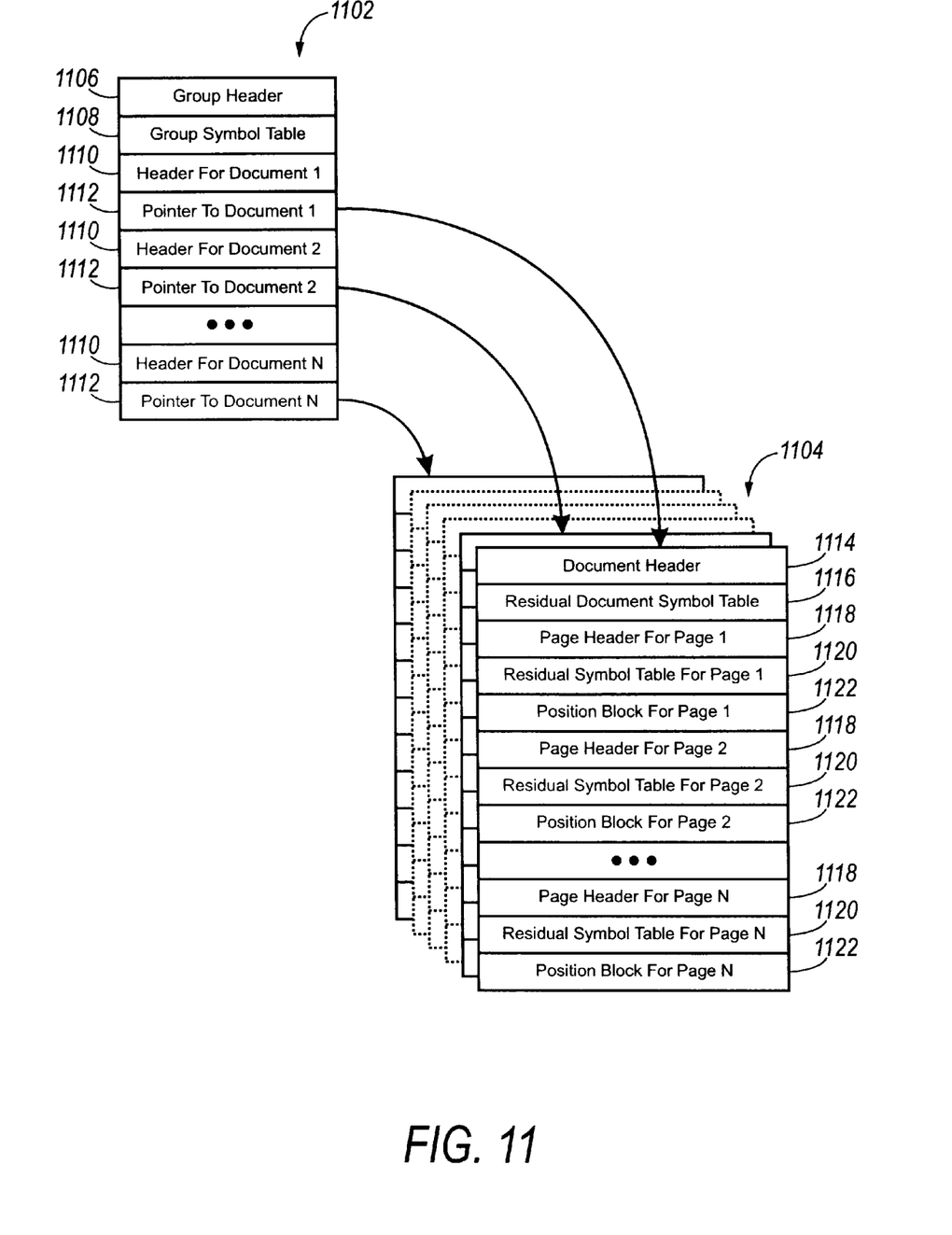
FIG. 11 is a block diagram which illustrates a collection of documents compressed in the tokenized file format.

FIG. 11 is a block diagram which illustrates a collection of documents compressed in the DigiPaper file format (or tokenized file format). Generally, the tokenized representation has a collective symbol table that includes a group section and unique document sections, which are indicated by reference numbers 1102 and 1104, respectively. The group section 1102 begins with a group header 1106 which may for example identify those documents in the corpus which form part of the group. In addition, the group section 1102 includes a group symbol table 1108, that has recorded therein any symbols which repeat in documents of the group.

Also, for each document in the group, the group section 1102 includes a document header 1110 and a pointer 1112 to a header 1114 of a unique document section 1104. Each unique document section 1104 includes a residual document symbol table 1116. Each residual document symbol table 1116 has recorded therein those symbols which repeat between page images but do not repeat between document images in the group. For each document page, each unique document section includes a page header 1118, a residual page symbol table 1120 (which includes those symbols that repeat on the page), and a table of positions 1122 (also referred to herein as a position block).

Because of the hierarchical structure of the collective representation of documents in FIG. 11, a single document image can be efficiently extracted from the collective representation. For example, when a document image is transmitted to another location on the Internet, the collective representation is reduced to the group header 1108 and a single unique document section 1104 that corresponds to the selected document image. Also, it can be seen from the representation of documents in FIG. 11 how a collection of documents which share a collective symbol table can be efficiently browsed over the Internet. For example, an internet browser initially retrieving a first document will receive the group section 1102 and one unique document section 1104. Any subsequent document retrieved by the Internet browser requires transmission of only the unique document section 1104 corresponding to the newly requested document.

Once the steps enumerated in FIG. 5 are carried out to formulate collective symbol tables for a corpus of documents, an additional document can be added to the corpus by identifying an existing collective symbol table with a sufficient number of recurring symbols. That is, an additional symbol table can be added if an existing collective symbol table in the corpus has symbols which are sufficiently equivalent to the symbols in the symbol table of the additional document (as set forth above at step 502 in FIG. 5). In the event no group symbol table is found with a sufficiently large enough number of matching symbols, the symbol table of the additional document is added to the document corpus as a new collective symbol table as shown above for document 3 in the example illustrated in FIGS. 6–10. Table 1, which follows, sets forth pseudo code for adding a document image "d" to an existing corpus of documents having "m" collective symbol tables. In an alternate embodiment, the pseudo code is repeated for each document in a corpus of documents without ever performing the steps set forth in FIG. 5.

TABLE 1 compress document image d on its own to produce a new temporary symbol table t,
compare each symbol in the temporary symbol table t to each of m collective symbol tables making up the corpus of documents;
if a large fraction k of ts symbols match those of one of the m collective symbol tables then add the matching symbols to the collective symbol table;
else initialize a new collective symbol table using the temporary symbol table t;

D. Image Decompression

Figure 12:
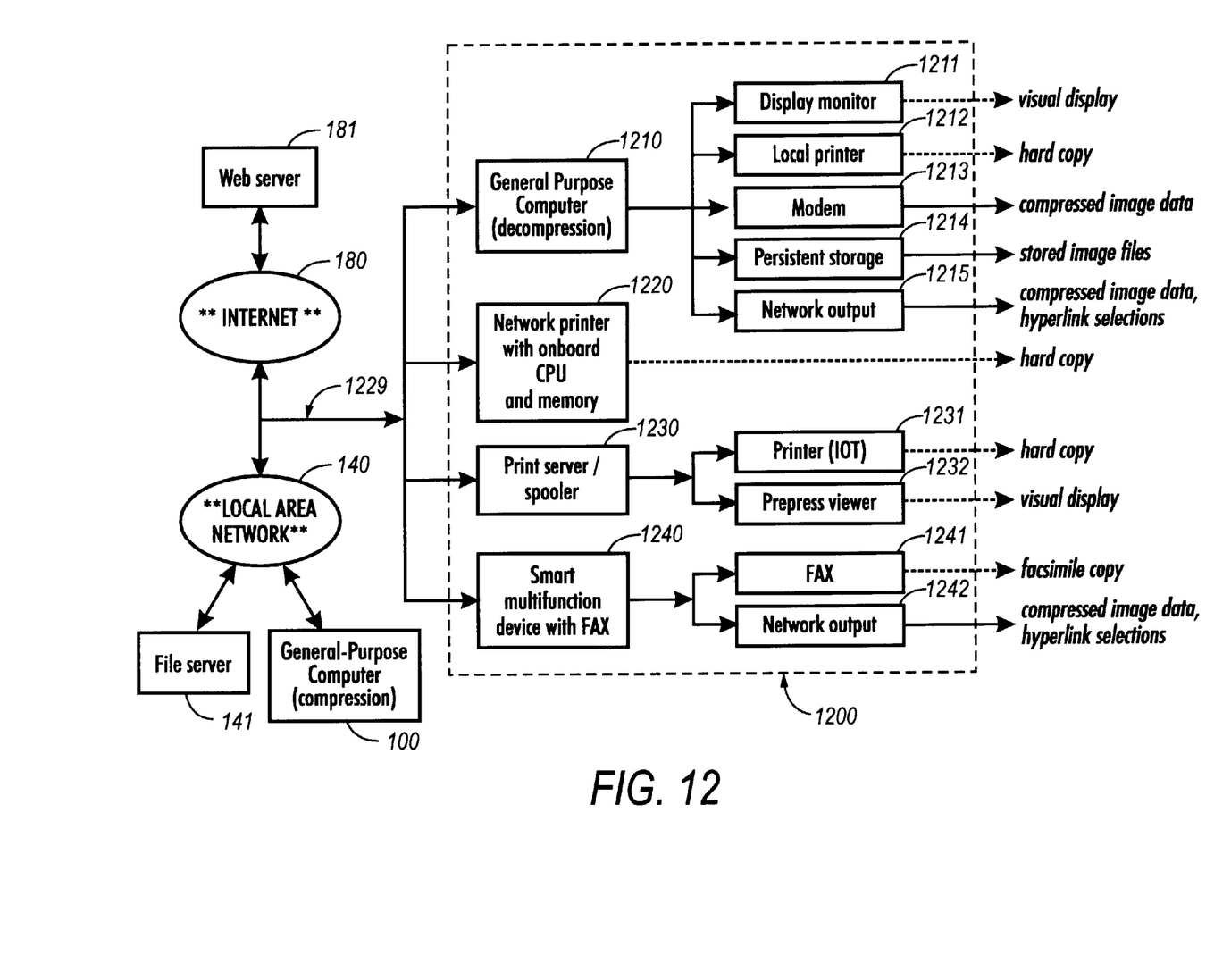
FIG. 12 illustrates a system environment in which various system components can be used to render tokenized representations of documents.

FIG. 12 illustrates a system environment in which various system components 1200 can be used to render tokenized representations of documents compressed by compressors 165 and 166. During operation of each of components 1200 of the system in FIG. 12, one or more documents that have been previously converted to a tokenized representation using compressors 165 and 166 are decompressed. Components 1200 include a second general purpose computer 1210, a network printer 1220, a print server 1230, and a "smart" multifunction device 1240. Each of these components is assumed to include communications software enabling the processor to obtain a tokenized representation of documents form a corpus of documents, and decompression software enabling the processor to turn that tokenized representation into image data suitable for a particular form of output. The decompression software can be resident in a particular component, or can be downloaded along with the tokenized representation from LAN 140 or the Internet 180 via connection 1229.

D.1 System Environment For Performing Image Decompression

Computer 1210 can be a general-purpose computer with characteristics and hardware components similar to those of computer 100. Also like computer 100, computer 1210 has software that includes an operating system controlling one or more tasks. However, whereas computer 100 has compression software, computer 1210 has decompression software. That is, the software of computer 1210 includes software that itself renders the processor of computer 1210 capable of decompressing the tokenized representation, or else includes network client software that the processor can execute to download the decompression software, which in turn can be executed to decompress the tokenized representation. (Note that a computer can, of course, have both compression and decompression software loaded into its memory, and that in some cases, a single computer can act as both compression computer 100 and decompression computer 1210.)

Computer 1210 is shown connected to a display monitor 1211, a local printer 1212, a modem 1213, a persistent storage device 1214, and network output hardware 1215. Computer 1210 can control these devices and, in particular, can run decompression software appropriate for each of them. For example, by executing decompression software appropriate for display monitor 1211, the processor of computer 1210 can cause a tokenized representation to be decompressed into a form that display monitor 1211 can display. Thus computer 1210 and display monitor 1211 together serve as a rendering engine for visual display. Similarly, computer 1210 and local printer 1212 can render the tokenized representation of the document as hardcopy output. Local printer 1212 can be a "dumb" printer, with little or no on-board computing hardware, since computer 1210 does the work of decompression.

Further, computer 1210 can render the document image(s) in forms not immediately readable by a human being, but useful nonetheless. Computer 1210 can run decompression software that outputs image data in unstructured (e.g., CCITT Group-4) compressed format, which can be transmitted across telephone lines by modem 1213. Computer 1210 can also output uncompressed or compressed image data to persistent storage 1214 for later retrieval, and can output uncompressed or compressed image data to network output device 1215 for transmission elsewhere (e.g., to another computer in LAN 140 or the Internet 180). If the decompressed document includes hypertext links or other annotations computer 1210 can interpret a user's indicated selections of such annotations and can transmit these selections across the network along with the image data.

Network printer 1220 is a printer that has its own on-board computing hardware, including a CPU and memory. Therefore, unlike local printer 1212, network printer 1220 can perform its own decompression without the aid of a host computer or server. Network printer 1220 is thus a full-fledged rendering engine, capable of turning tokenized input files into hardcopy output. Print server 1230 is a computer that can control "dumb" printers and that can be used for temporary storage of files to be printed by such printers. Whereas general-purpose computer 1210 is assumed to be a computer that is used interactively by a human user, print server 1230 is a computer used primarily for controlling printers and print jobs. Its processor executes decompression software to produce images that can be sent to IOT 1231 for immediate printout, sent to a prepress viewer 1232 for preliminary inspection prior to printing, or spooled (temporarily stored) in persistent storage of print server 1230 for later printing or prepress viewing.

Multifunction devices are a class of standalone devices that offer a combination of printing, copying, scanning, and facsimile functions. Multifunction device 1240 is assumed to be a "smart" device, having its own processor and memory, with sufficient computing power to decompress its own tokenized files without assistance from a host computer or server. Here, it is shown providing output to the network via network output device 1242; if a multifunction device 1240 has software to support a paper user interface, the output data can include hypertext link selections or other information in addition to the image data. Multifunction device 1240 is also shown providing compressed image data to a facsimile machine 1241. For example, multifunction device 1240 can contact facsimile machine 1241 by ordinary telephone, and send it compressed image data in CCITT Group-4 format. Facsimile machine 1241 receives the fax transmission from multifunction device 1240 as it would any other fax transmission, and prints out a copy of the document.

D.2 Details of Image Decompression

Figure 13:
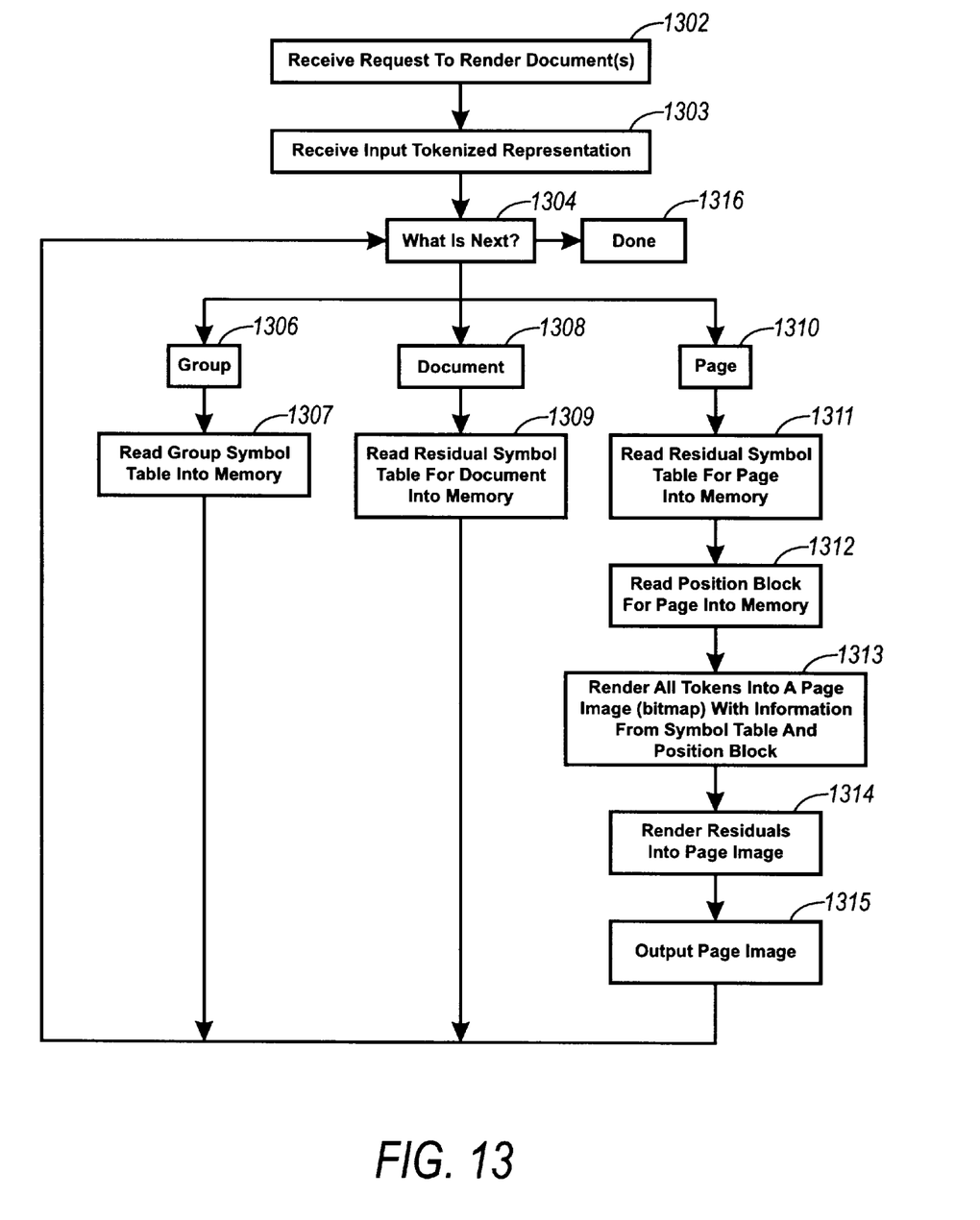
FIG. 13 is a flow diagram of the steps for rendering a tokenized representation of a collection of documents.

FIG. 13 is a flow diagram of the steps for rendering a tokenized representation of a collection of documents. Initially at step 1302 an input request is received by one of the components 1200 shown in FIG. 12. The input request may specify that one or more document images are to be rendered. In addition at step 1303, one of the components 1200 receives and reads into memory an input tokenized representation similar to the tokenized representation illustrated in FIG. 11. Subsequently at step 1304, a loop begins as a decompressor, which is operating on the components 1200, reads through the blocks of the tokenized representation to identify one of three different headers. If the next block is a group symbol table header 1106 at step 1306, the group symbol table 1108 is read into memory at step 1307. Whereas if the next block is a document header 1110/1114 at step 1308, the residual document symbol table 1116 is read into memory at step 1309. Alternatively, if the next block is a page header 1118 at step 1310, the residual page symbol table 1120 is read into memory at step 1311.

After reading the requisite symbols in memory for the group, document, and page at steps 1307, 1309, and 1311, respectively, the decompressor reads the position block 1122 for a page into memory at step 1312. It will be understood by those skilled in the art that a document image may compress in such a way that there exists only symbols in the group symbol table 1108 and none in the residual document or page symbol tables 1116 and 1120. Alternatively, a document image may compress in such a way that there exists only symbols in the group and residual document symbol tables 1108 and 1116, and none in the residual page symbol table 1120. At step 1313, the decompressor renders all tokens into a page image using the symbol table and position block loaded in memory. In completing step 1313, the residual symbol table 1120 and the position block 1122 of the completed page image are deleted from memory. In addition, if the last page image of a document image is completed at step 1113, the residual document symbol table 1116 is deleted from memory as well. At step 1314, residual document elements are rendered, and their resulting bitmaps are transferred into a rendered page image. The completed page image is output at step 1315 to one of a display screen, IOT, persistent storage, network, fax, or other output mechanism. The loop continues at step 1304 until it terminates at step 1316 when each document in the tokenized representation of a collection of documents has been processed.

E. Conclusion

To recapitulate, document images in a corpus are compressed into a tokenized file format. The tokenized file format reduces each document to a symbol table and a position table. Subsequently, the symbol tables of the documents in the corpus are divided into relatively typeface-homogeneous groups. For the symbol tables in each group, a collective symbol table is generated. The advantage of this document corpus compression format is that the overall storage requirement of a corpus of documents is reduced. Another advantage of storing documents using collective symbol tables is that documents in the corpus are stored according to their relationship with other documents in the corpus. This implies that related documents in a corpus may share a collective symbol table. A further advantage of this corpus compression format is that the amount of processing required to perform OCR (Optical Character Recognition) on documents in the corpus is reduced because symbol tables are shared across the corpus. Yet a further advantage of this corpus compression format is realized when several documents are transmitted between client and server.

The compression/decompression system may be readily implemented in software using software development environments that provide portable source code that can be used on a variety of hardware platforms. Alternatively, the disclosed system may be implemented partially or fully in hardware using standard or custom logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. A method for compressing a corpus of documents stored in a memory of a computer system, comprising the steps of:

converting each document in the corpus of documents stored in the memory into a tokenized representation that includes a document symbol table and a document position table;

arranging in the memory the document symbol tables of the documents in the corpus of documents into groups of symbol tables with recurring symbols; and computing a collective symbol table for each group of document symbol tables arranged in the memory; said computing step compressing the tokenized representations of the documents stored in the memory by sharing recurring symbols across the documents in the corpus of documents;

wherein said computing step hierarchically arranges each computed collective symbol table into a group symbol table, a residual document symbol table, and a residual page symbol table.

2. The method according to claim 1, wherein said converting step further comprises the steps of:

identifying shapes in page images of each document; and assigning a single shape to represent multiple occurrences of similar shapes identified by said identifying step.

3. The method according to claim 1, wherein said arranging step arranges a first document symbol table and a second document symbol table into a group of symbol tables when a fraction of the symbols in the first document symbol table recur in the second document symbol table.

4. The method according to claim 1, further comprising the step of rendering a page description language of page images of the documents in the corpus into bitmap images.

5. The method according to claim 1, further comprising the step of assembling the document symbol table of each document in the corpus of documents before performing said arranging step.

6. The method according to claim 5, further comprising the steps of:

forming clusters of similar shapes with symbols in the assembled document symbol tables; and identifying cross-clustering relationships between documents in the corpus of documents with the clusters of similar shapes.

7. The method according to claim 1, wherein said computing step further comprises the step of updating the document position table of each document to correspond with the collective symbol tables computed at said computing step.

8. The method according to claim 7, further comprising the step of decompressing page images in the corpus of documents by rendering page images with information from the collective symbol tables and the updated document position tables.

9. A program storage device readable by a server workstation, embodying a program of instructions executable by the server workstation to perform method steps for compressing a corpus of documents stored in a memory of a computer system, said method steps comprising:

converting each document in the corpus of documents stored in the memory into a tokenized representation that includes a document symbol table and a document position table;

arranging in the memory the document symbol tables of the documents in the corpus of documents into groups of symbol tables with recurring symbols; and computing a collective symbol table for each group of document symbol tables arranged in the memory; said computing step compressing the tokenized representations of documents stored in the memory by sharing recurring symbols across the documents in the corpus of documents;

wherein said computing step hierarchically arranges each computed collective symbol table into a group symbol table, a residual document symbol table, and a residual page symbol table.

10. The program storage device as recited in claim 9, wherein said computing step of said method steps further comprises the step of assembling the document symbol table of each document in the corpus of documents before performing said arranging step.

11. The program storage device as recited in claim 10, wherein said method steps further comprises the steps of:
   forming clusters of similar shapes with symbols in the assembled document symbol tables; and
   identifying cross-clustering relationships between documents in the corpus of documents with the clusters of similar shapes.

12. The program storage device as recited in claim 9, wherein said method steps further comprises the step of updating the document position table of each document to correspond with the collective symbol tables computed at said computing step.

13. An apparatus for compressing a corpus of documents stored in a memory of a computer system, comprising:
   means for converting each document in the corpus of documents stored in the memory into a tokenized representation that includes a document symbol table and a document position table;
   means for arranging in the memory the document symbol tables of the documents in the corpus of documents into groups of symbol tables with recurring symbols; and
   means for computing a collective symbol table for each group of document symbol tables arranged in the memory; said computing means compressing the tokenized representations of the documents stored in the memory by sharing recurring symbols across the documents in the corpus of documents;
   wherein said computing means hierarchically arranges each computed collective symbol table into a group symbol table, a residual document symbol table, and a residual page symbol table.

14. The apparatus according to claim 13, further comprising means for assembling the document symbol table of each document in the corpus of documents.

15. The apparatus according to claim 14, further comprising:
   means for forming clusters of similar shapes with symbols in the assembled document symbol tables; and
   means for identifying cross-clustering relationships between documents in the corpus of documents with the clusters of similar shapes.

16. The apparatus according to claim 13, wherein said computing means further comprises means for updating the document position table of each document to correspond with the collective symbol tables computed by said computing means.

17. The apparatus according to claim 16, further comprising means for decompressing page images in the corpus of documents by rendering page images with information from the collective symbol tables and the updated document position tables.

* * * * *